UNITED STATES PATENT OFFICE.

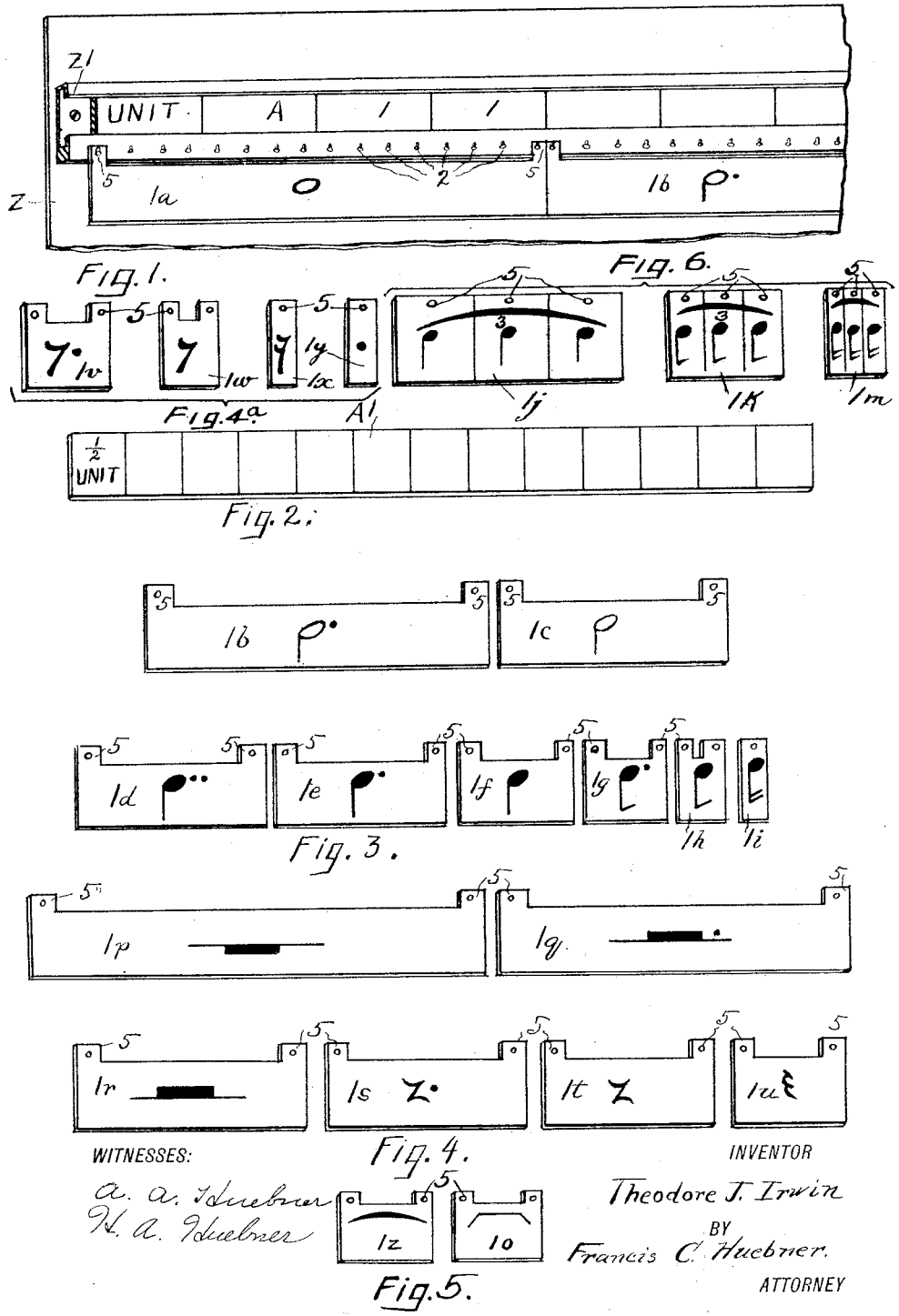

THEODORE J. IRWIN, OF FRESNO, CALIFORNIA.

MUSICAL INSTRUCTION.

1,212,356.     Specification of Letters Patent.     Patented Jan. 16, 1917.

Application filed December 29, 1915. Serial No. 69,186.

*To all whom it may concern:*

Be it known that I, THEODORE J. IRWIN, a citizen of the United States, and a resident of the city of Fresno, county of Fresno, and State of California, have invented a new and useful Device for Imparting Musical Instruction, of which the following is a specification.

In teaching the art of music to children by present methods, it is difficult for many to grasp the relative values of the different forms of rests, notes and musical symbols by mere verbal instruction, and I have invented a device having movable cards thereon by which these relative values can be seen and felt by the pupil, thus appealing to his sense of sight, touch and hearing, by using my method in connection with verbal instruction.

In the drawing accompanying this specification Figure 1 shows a portion of the base for holding the movable cards, having a slideway thereon with one form of time scale within the slide, and blocks, or cards having note values printed thereon attached. Fig. 2 shows a modified form of the time scale. Figs. 3, 4, 4$^a$, 5 and 6 show series of cards having musical symbols printed thereon.

In said drawings Z represents the base, or board on which the cards are attached. $Z^1$ is a slideway hung to base Z, and is constructed to hold the time scale A which is shown in the slideway $Z^1$. The time scale A is preferably made of a strip of stiff material which is divided by cross lines into a plurality of equal divisions, the object being that each of said divisions shall represent a unit, or a fractional unit of time. 1 represents one of such units. $A^1$ is a time scale divided into one-half units, and can be substituted in said slideway $Z^1$ for the time scale divided into units shown therein on the drawing.

2 is a plurality of uniformly spaced hooks attached to slideway $Z^1$ parallel with the time scale, and directly under it.

In the drawing and specification the term "unit" indicates a time value of a quarter note.

$1^a$, $1^b$, $1^c$, $1^d$, $1^e$, $1^f$, $1^g$, $1^h$, and $1^i$ are cards having notes printed thereon which are musically termed, whole note, dotted half note, half note, double dotted quarter note, dotted quarter note, quarter note, dotted eighth note, eighth note, and sixteenth note.

$1^p$, $1^q$, $1^r$, $1^s$, $1^t$, $1^u$, $1^v$, $1^w$ and $1^x$ are cards having rests of various values indicated as printed on such cards. Each of these cards is of a length corresponding to the value of the musical symbol printed thereon taking the unit measure 1 as the value of a quarter note or quarter rest.

$1^y$, $1^z$, and $1^o$ are cards having a dot, and braces printed thereon.

$1^j$, $1^k$ and $1^m$ are cards having triplet notes printed thereon, the length of the card corresponding to the value in time of such triplet notes indicated on the card. Each of such cards has holes 5 therein for the purpose of hanging the cards, singly, or collectively on hooks 2. The object of this device is to hang the card containing the musical symbol directly under the time scale so at a glance the pupil will perceive the musical symbol, and the relative length of such symbol in time on the time scale.

Having described my invention, I claim as new and ask that Letters Patent be granted me upon:

1. In a musical educational device, the combination of a base, a member attached thereto having a longitudinal groove therein, such groove being open toward the front, a plurality of hooks equidistantly arranged in a row parallel to, and immediately under such groove, a time scale constructed to readily slide within said groove, the time scale having a plurality of equal divisions marked thereon and a plurality of cards having means thereon for hanging them on said hooks, said cards having musical symbols thereon, each card being of a length corresponding to the time value of the symbol printed thereon in relation to said time scale.

2. In a musical educational device the combination of a base, a row of hooks equidistantly arranged across said base, a groove in said base parallel to the row of hooks and above them, a time scale constructed to fit within the groove, and having equal divisions marked thereon corresponding to the distance between said hooks or multiples thereof, a card the length of such division and having printed thereon a musical symbol equal to a quarter note in time, and a plurality of additional cards having musical symbols printed thereon, the lengths of said cards being proportional to the time value of the symbols printed on them.

THEODORE J. IRWIN.

Witnesses:
W. N. GRIMES,
H. A. HUEBNER.